United States Patent
Sampigethaya et al.

(10) Patent No.: US 9,052,375 B2
(45) Date of Patent: Jun. 9, 2015

(54) METHOD FOR VALIDATING AIRCRAFT TRAFFIC CONTROL DATA

(75) Inventors: Radhakrishna G. Sampigethaya, Bellevue, WA (US); Radha Poovendran, Seattle, WA (US); Linda Bushnell, Seattle, WA (US)

(73) Assignee: The Boeing Company, Chicago, IL (US)

(*) Notice: Subject to any disclaimer, the term of this patent is extended or adjusted under 35 U.S.C. 154(b) by 329 days.

(21) Appl. No.: 12/841,349

(22) Filed: Jul. 22, 2010

(65) Prior Publication Data

US 2011/0057830 A1   Mar. 10, 2011

Related U.S. Application Data

(60) Provisional application No. 61/241,094, filed on Sep. 10, 2009.

(51) Int. Cl.
   *G01S 13/00* (2006.01)
   *H04M 11/04* (2006.01)
   (Continued)

(52) U.S. Cl.
   CPC .......... *G01S 5/0072* (2013.01); *G01S 5/22* (2013.01); *G01S 11/08* (2013.01); *G01S 5/06* (2013.01); *G01S 1/30* (2013.01); *G01S 5/0289* (2013.01); *G08G 5/0008* (2013.01)

(58) Field of Classification Search
   CPC ....... G01S 5/0072; G01S 5/0289; G01S 5/06; G01S 5/22; G01S 1/30; G01S 11/08; G08G 5/0008
   USPC ........... 701/29.3, 31.5, 32.3, 32.6, 32.7, 34.4, 701/408, 422, 451, 465, 468, 469, 472, 482, 701/486, 519; 455/404.2, 414.2, 456.1, 455/457; 370/252, 449, 450; 342/29–32, 342/36–42, 63–65, 118–146, 454–465; 340/988–995.28, 945–983
   See application file for complete search history.

(56) References Cited

U.S. PATENT DOCUMENTS 3,659,085 A * 4/1972 Potter et al. .................... 701/518
4,359,733 A * 11/1982 O'Neill .......................... 342/36
(Continued)

OTHER PUBLICATIONS

Capkun and Hubaux, "Securing Position and Distance verification in Wireless Networks", Technical Report EPFLIIC/200443, May 2004.*
Sampigethaya, Li, Huang, Poovendram, "AMOEBA: Robust Location Privacy Scheme for VANET", IEEE Journal on Selected Areas in Communications, 25:8, pp. 1569-1589.*
Russell and Zuckerman, "Perfect Information leader election in log n+O(I) Rounds", 39th Annual Symposium on Foundations of Computer Science (FOCS) Proceedings, pp. 576-583, Nov. 1998.*
(Continued)

*Primary Examiner* — Khoi Tran
*Assistant Examiner* — Abby Lin
(74) *Attorney, Agent, or Firm* — Womble Carlyle Sandridge & Rice LLP

(57) ABSTRACT

A method for group travel and group communications, wherein the group travel parameters and group communications are combined for verifying and validating ADS-B data on aircraft. The full connectivity within a navigating group of aircraft allows all the group members to communicate spatial/temporal observations and collaborate in group protocols, e.g., majority voting protocol, which can determine if a received ADS-B message is corrupted or from a false target aircraft. Well-established distributed protocols based on group communications and majority voting exist for (1) detecting compromised members, i.e., false target aircraft, and (2) verifying message integrity, i.e., ADS-B data, given a minority fraction of members are compromised/colluding. Such protocols can be based on IP multicast communications over the IP networking data links available on the aircraft. Also disclosed is a method for verification and validation of position indicator message data on aircraft.

18 Claims, 7 Drawing Sheets

(51) Int. Cl.
*H04W 24/00* (2009.01)
*G01C 21/00* (2006.01)
*G01S 5/00* (2006.01)
*G01S 11/08* (2006.01)
*G01S 1/30* (2006.01)
*G01S 5/02* (2010.01)
G01S 5/22 (2006.01)
G01S 5/06 (2006.01)
G08G 5/00 (2006.01)

(56) References Cited

U.S. PATENT DOCUMENTS

| | | | | |
|---|---|---|---|---|
| 5,917,449 | A * | 6/1999 | Sanderford et al. | 342/457 |
| 6,400,690 | B1 * | 6/2002 | Liu et al. | 370/252 |
| 6,910,657 | B2 * | 6/2005 | Schneider | 244/3.11 |
| 6,917,306 | B2 * | 7/2005 | Lilja | 340/903 |
| 6,925,378 | B2 * | 8/2005 | Tzamaloukas | 701/428 |
| 7,275,014 | B1 * | 9/2007 | Koren et al. | 702/150 |
| 7,313,143 | B1 * | 12/2007 | Bruno | 370/395.4 |
| 2001/0005804 | A1 * | 6/2001 | Rayner | 701/35 |
| 2002/0147542 | A1 * | 10/2002 | Tomescu | 701/120 |
| 2003/0030581 | A1 * | 2/2003 | Roy | 342/36 |
| 2004/0096063 | A1 * | 5/2004 | Carroni et al. | 380/279 |
| 2005/0090201 | A1 * | 4/2005 | Lengies et al. | 455/41.2 |
| 2005/0232185 | A1 * | 10/2005 | Hudson et al. | 370/328 |
| 2006/0111822 | A1 * | 5/2006 | Simon | 701/29 |
| 2006/0167618 | A1 * | 7/2006 | Werback | 701/120 |
| 2007/0027611 | A1 * | 2/2007 | Piekarz | 701/117 |
| 2007/0129006 | A1 * | 6/2007 | Goldberg et al. | 455/3.06 |
| 2007/0252760 | A1 * | 11/2007 | Smith et al. | 342/451 |
| 2008/0151876 | A1 * | 6/2008 | Wilson et al. | 370/352 |
| 2009/0103452 | A1 * | 4/2009 | Horvath | 370/254 |
| 2009/0103473 | A1 * | 4/2009 | Foster et al. | 370/316 |
| 2009/0201191 | A1 * | 8/2009 | Kozhevnikov et al. | 342/32 |
| 2010/0246492 | A1 * | 9/2010 | Scarlatti et al. | 370/328 |
| 2011/0015852 | A1 * | 1/2011 | Blomenhofer et al. | 701/120 |
| 2011/0140950 | A1 * | 6/2011 | Andersson | 342/32 |
| 2011/0231036 | A1 * | 9/2011 | Yogesha et al. | 701/3 |
| 2013/0093625 | A1 * | 4/2013 | Smith | 342/387 |

OTHER PUBLICATIONS

Capkun and Hubaux, "Securing Position and Distance verification in Wireless Networks", Technical Report EPFL/IC/200443, May 2004, Applicant's Specification.*

Sampigethaya, Li, Huang, Poovendram, "AMOEBA: Robust Location Privacy Scheme for VANET", IEEE Journal on Selected Areas in Communications, 25:8, 2007.*

Capkun and Hubaux, "Securing Position and Distance verification in Wireless Networks", Technical Report EPFL/IC/200443, May 2004.*

Cho et al, "Partial Group Session Key Agreement Scheme for Mobile Agents in e-Commerce Environment", PRIMA 2006, LNAI 4088, pp. 420-431, 2006.*

Adrian Perrig and J.D. Tygar, Chapter 1: Introduction, "Secure Broadcast Communication: In Wired and Wireless Networks", Springer, Oct. 1, 2002 | ISBN-10: 0792376501 | ISBN-13: 978-0792376507 | Edition: 2003 Excerpt is also available at: http://users.ece.cmu.edu/~adrian/book.html.*

Sampigethaya, Li, Huang, Poovendram, "AMOEBA: Robust Location Privacy Scheme for VANET", IEEE Journal on Selected Areas in Communications, 25:8, pp. 1569-1589, 2007.*

C. Wang, A. Kao, J. Choi and R. Tjoelker, "Discovering Time-Constrained Patters from Long Sequences", Studies in Computational Intelligence (SCI), 2008, vol. 116, pp. 99-116, Spring-Verlag Berlin Heidelberg.

K. Samuelson, E. Valovage, D. Hall, "Enhanced ADS-B Research", Proceedings of IEEE Aerospace Conference, 2006.

Krozel and D. Andrisani, "Independent ADS-B Verification and Validation," proceedings of the AIAA Aviation, Technology, Integration and Operations Conference (ATIO), pp. 1-11, 2005.

Krozel, D. Andrisani, M. Ayoubi, T. Hosizaki, C. Schwalm, "Aircraft ADS-B Data Integrity Check," Proceedings of the AIAA Aviation, Technology, Integration and Operations Conference (ATIO), 2004.

H. Mannila, H. Toivonen, A. Inkeri Verkamo, "Discovery of Frequent Episodes in Event Sequences", Data Mining and Knowledge Discovery 1, pp. 259-289, 1997, Kluwer Academic Publishers, The Netherlands.

* cited by examiner

METHOD FOR VALIDATING AIRCRAFT TRAFFIC CONTROL DATA

CROSS-REFERENCE TO RELATED APPLICATIONS

This application claims the benefit of U.S. Provisional Application No. 61/241,094, filed Sep. 10, 2009.

BACKGROUND

The application generally relates to a method for validating aircraft traffic control data, and more specifically to a method for verification and validation of ADS-B data on aircraft.

Current air traffic management systems suffer from poor radar coverage and a highly centralized architecture. Under heavy traffic loads the deficiencies may overwhelm Air Traffic Control (ATC) centers. Such limitations can lead to inefficient use of the available airspace capacity and insecure scenarios such as low-visibility landings. Air transportation systems with e-enabled aircraft and networked technologies, such as Automatic Dependent Surveillance Broadcast (ADS-B), are computer-based communications systems developed to assist in reducing traffic congestion and air traffic control inefficiencies by enabling exchange of precise surveillance data in shared airspace. E-enabled aircraft means an aircraft with advanced computing, sensing, control, and communications, which is capable of communicating in a global information network, e.g., as a network node. Cyber security is a concern with highly accurate surveillance of aircraft navigating in a shared space. A framework is necessary to protect traffic data for both ground and airborne surveillance of aircraft. The framework must identify major threats and vulnerabilities from cyber exploits, specify security requirements and mitigation solutions.

Automatic Dependent Surveillance Broadcast (ADS-B) is a position indication message or signal that allows an e-enabled aircraft to periodically broadcast, e.g., once or twice every second, traffic beacons containing its current state vector, i.e., position, altitude, velocity, time, etc. and intent, which combined describe the aircraft's motion in airspace. The aircraft uses the ADS-B OUT mode to broadcast traffic beacons. Ground controllers and aircraft one communication hop away use the ADS-B IN mode for performing ground surveillance and airborne surveillance, respectively. In ground surveillance the ground air traffic controllers utilize these aircraft traffic beacons to monitor aircraft in airspace. In airborne surveillance the traffic beacons can be used by neighboring aircraft in the shared airspace. The overall enhancements in situational awareness and information sharing can help to optimize time and costs of air travel. ADS-B can be implemented over several different data link technologies, including Mode-S Extended Squitter (1090 ES), Universal Access Transceiver (978 MHz UAT), and VHF data link (VDL Mode 4).

Critical air traffic control tasks depend on the integrity of ADS-B data received over a shared data link. Intruders may attempt to intentionally create errors in ground and airborne surveillance, for example, by corrupting or spoofing ADS-B data, thereby incurring unwarranted flight delays, unnecessary safety concerns and operational costs in the air traffic control system. For instance, creating false conflicts by broadcast of false data from a general aviation aircraft equipped with a Universal Access Transceiver or an unattended ground ADS-B station. Ground and airborne surveillance may be vulnerable to such errors associated with ADS-B data.

Multilateration-based solutions can mitigate major vulnerabilities in ground surveillance by using at least four ground stations to receive the ADS-B messages. However, multilateration-based solutions are not effective for mitigating vulnerability in airborne surveillance, because of the infeasibility of using time-of-arrival based multilateration in a single mobile aircraft for verifying positions of ADS-B message sources as well as potential for easy spoofing over the ADS-B data link.

Until now, existing methods for verifying integrity of ADS-B positions are available for ground surveillance system. For airborne surveillance an aircraft can independently verify integrity of ADS-B data in the presence of errors and missing data points using existing methods, but it is not currently possible to verify the integrity of ADS-B data in the presence of malicious intruders. There is currently no solution to enable a trustworthy, high confidence verification and validation of ADS-B position information in airborne surveillance in the presence of malicious attackers.

For ground surveillance systems, multilateration is a well-established method for verifying aircraft position data. Multilateration-based methods have been proposed to verify position information received at the ground controllers via ADS-B. Two multilaterations may be combined at a ground controller, one multilateration from use of time-of-arrival of the aircraft traffic beacons and another multilateration from that enabled by ADS-B. This method works in well-covered regions, such as terminal areas, where at least four ground controllers are available to verify an aircraft's three dimensional (3-D) position in space. Another means for verifying ADS-B data terminal areas is the use of secondary surveillance radar. For remote regions with lesser ground-based coverage, an alternate existing method for position verification of aircraft is the use of ADS-B enabled multilateration in combination with Kalman filter estimation of the flight trajectory. Kalman filter estimation is based on the bearing information of the source aircraft making the position claim. This approach however requires a dedicated omni-directional antenna onboard the aircraft for deriving the heading information of the source, and a dedicated omni-directional onboard antenna may not be provided on all aircraft.

Multilateration in some situations may have weaknesses, since it is possible to simulate virtual transmitters at a given position by varying the timing of multiple transmitters or offset the position calculation by disrupting clock synchronization of the ground receivers. In such cases, additional position verification mechanisms, such as primary surveillance radar, and cryptographic mechanisms, e.g., symmetric-key based solutions which require the aircraft and the ground controller to share a secret code or password in advance can help to protect the integrity of ADS-B data received at the ground controllers.

However, both symmetric and asymmetric cryptography are not viable for protecting ADS-B data received by aircraft in airborne surveillance. Major challenges include the impracticality of sharing a secret code between two aircraft and managing onboard digital certificates in a future air traffic system that is highly dense and interactive with aircraft spanning global routes. While ground controllers may authenticate signed ADS-B broadcasts from an aircraft using a common shared key or digital certificate of that aircraft, this authentication capability does not currently extend to aircraft themselves because of trust, scalability, real-time and regulatory constraints. Therefore, use of multilateration, ground radar, and cryptography solutions apply only to verification of positions in ADS-B data in ground surveillance, where ground controllers use received ADS-B messages to monitor the airspace. None of the solutions described above enables an aircraft to verify position information in ADS-B data received from other aircraft in airborne surveillance, because an aircraft cannot independently estimate 3-D position of another aircraft using received signal measurements. Further, global mobility and high density of airspace impede aircraft from exchanging secret codes to enable secure communications.

One proposed method in which an aircraft may independently verify integrity of received ADS-B data despite missing or erroneous data points, without an additional source of surveillance information such as heading or bearing of the position claimer, uses a Kalman filter to estimate a target aircraft's state as well as analyze the aircraft intent from successfully received ADS-B messages of the target. This method verifies that the target aircraft conforms to the intent included in its ADS-B messages. Such methods fail to provide trustworthy verification and validation in the presence of malicious attackers that may be capable of spoofing, corrupting or blocking any number of ADS-B messages received, to bias the computed state estimate and intent analysis of one or more target aircraft.

Multilateration-based methods for verifying ADS-B data have to date not been applied to airborne surveillance because of the infeasibility of using multilateration in a single mobile aircraft for verifying positions of ADS-B message sources. Furthermore, the existing Kalman filter based position estimation method is not robust against malicious attackers who can spoof, corrupt or block ADS-B data sufficient number of times to intentionally bias the estimation results.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

The following embodiments and aspects thereof are described and illustrated in conjunction with systems and methods that are meant to be exemplary and illustrative, not limiting in scope. In various embodiments, one or more of the limitations described above in the Background have been reduced or eliminated, while other embodiments are directed to other improvements.

A method is disclosed for group travel and group communications, wherein the group travel parameters, i.e., spatial and temporal data measured or received by the group, and group communications are combined for verifying and validating ADS-B data on aircraft. Aircraft mostly follow predictable routes and usually travel in a pre-flight established trip time, allowing aircraft moving in a similar direction and within one-hop communication range to be a navigating group of communicating nodes for relatively long time periods. Due to their geographical proximity in airspace, it is likely that all aircraft in the group will simultaneously receive ADS-B messages from a neighboring aircraft. Each receiver of an ADS-B message can estimate the relative distance to the source of the ADS-B message by using received signal strength indicator (RSSI) measurements. Each receiver of an ADS-B message can also estimate the time of arrival of the received signal. These spatial and temporal estimates at the receivers can be used as information to verify the claimed 3-D position of the ADS-B message source. The full connectivity within a navigating group of aircraft allows all the group members to, as and when needed, communicate as well as collaborate in light-weight group protocols, e.g., majority voting protocol, which can determine if a received ADS-B message is corrupted or from a false target aircraft. Well-established distributed protocols based on group communications and majority voting exist for (1) detecting compromised members, i.e., false target aircraft, and (2) verifying message integrity, i.e., ADS-B data, given a minority fraction of members are compromised/colluding. Such protocols can be based on Internet Protocol (IP) multicast communications over the IP networking data links available on the aircraft.

A first embodiment of the disclosure includes a system for group aircraft communications in a group of aircraft. Each of the aircraft in the group is arranged to receive a position indicator message from a source. Each aircraft of the group includes an in-aircraft control network. The control network is arranged to verify and validate position indicator data included in the position indicator message based on communication of travel parameters between a first aircraft and at least one additional aircraft of the group; estimate the relative distance to the source; and verify a claimed position of the source through the travel parameters communicated between the first aircraft and the at least one additional aircraft.

Another embodiment of the disclosure includes a method for verification and validation of position indicator message data on aircraft. The method includes mapping positions of a plurality of aircraft travelling in a group using group communications and position indicator message data; enabling at least one collaborative distributed protocol based on communications within the group of aircraft; applying the at least one collaborative distributed protocol; and detecting a compromised aircraft of the plurality of aircraft based on the applied at least one collaborative distributed protocol, or verifying the integrity of the position indicator message data.

Yet another embodiment of the disclosure includes a method for position verification of a source aircraft by a plurality of aircraft. The method includes receiving a broadcast message including position indicator data from the source aircraft and recording a time of arrival of the broadcast message and position indicator data; composing a message including time of arrival, position indicator position and GPS time of P, and a time stamp each member of the group G composes a message that contains the recorded time of arrival, position indicator position and GPS time of P, and a time stamp; generating a keyed hash using a group key, and broadcasts message and keyed hash to other members; verify received messages in G; estimating an actual position of P by each aircraft in G; determining whether the actual position estimated by the group, and a claimed position of the source in the broadcast message are approximately equivalent, and, in response to the actual estimated position and the claimed position of the source being approximately equivalent, determining whether the source is a member of the group and initiating a group join protocol to enable share group secrets in response to determining that the source is not a member; or in response to determining that the actual estimated position and the claimed position of the source are not approximately equivalent, entering a distributed voting protocol; and deciding if the source is likely a compromised aircraft in response to the distributed voting protocol.

The disclosed method enables a mobile aircraft to verify and validate positions in ADS-B messages received and use them for airborne surveillance, in the presence of malicious attackers that aim to corrupt, spoof or block ADS-B data.

Alternative exemplary embodiments relate to other features and combinations of features as may be generally recited in the claims.

DETAILED DESCRIPTION OF THE EXEMPLARY EMBODIMENTS

Figure 1:
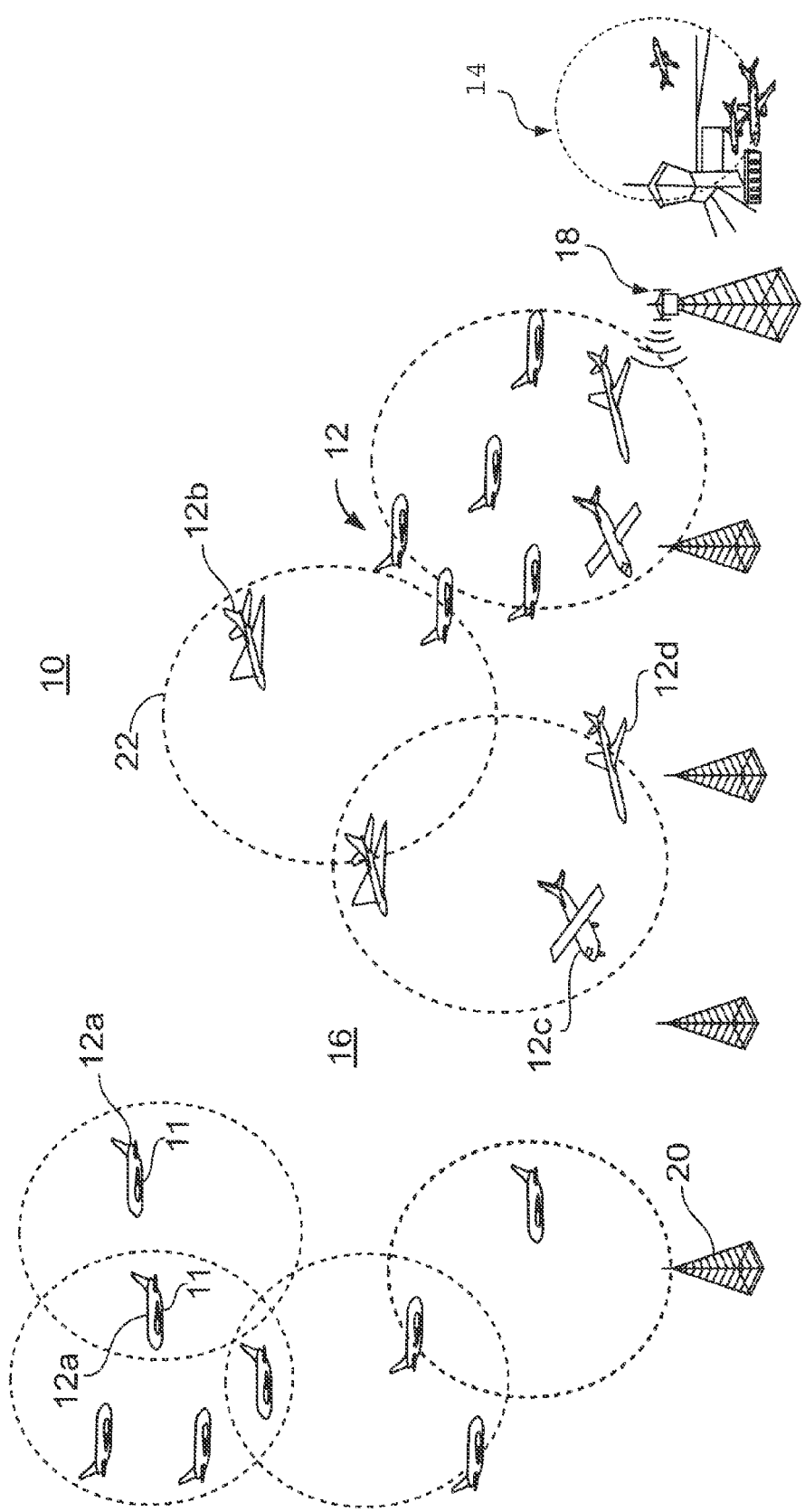
FIG. 1 illustrates an exemplary air traffic control system.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present disclosure provides novel solutions for verifying and validating ADS-B data transmitted in airline traffic beacons with a high degree of confidence. The disclosed data verification and validation method is effective despite the presence of malicious attackers who may corrupt, spoof or block ADS-B messages and/or introduce false targets in airspace. Further, the disclosed methods advantage only apply the group navigation properties of aircraft, specifically multiple aircraft moving contemporaneously in a generally similar direction which may form communications nodes with corresponding velocities. Group position data may be exchanged and analyzed and the resulting information, for example, Received Signal Strength Indicator (RSSI) and time-of-arrival (TOA) measurements, used by each group member to resolve uncertainties in ADS-B data received by group members. In one embodiment, such uncertainties may be resolved by executing majority voting algorithms in the group. Majority voting, also referred to as distributed voting, is well known by those skilled in the art as one example of a protocol for achieving fault-tolerance, consisting of a set of distributed processors all working on the same task, then voting on the independent results to select one result as the correct answer one.

The elements of the data verification and validation method include: (1) a plurality of aircraft travelling concurrently, i.e., the group travel concept; (2) use of group communications and collaborative protocols for detecting potentially compromised ADS-B messages and/or false target aircraft; (3) Enhancing the degree of confidence in the verification and validation of ADS-B data.

In addition to communicating over an ADS-B broadcast data link, the aircraft may also be equipped to communicate over other data links, e.g., for Internet Protocol (IP) based networking based Aeronautical Telecommunications Network (ATN).

In a first aspect, a plurality of aircraft moving in geographical proximity and moving in a similar direction can navigate in a group for a period of time with the same average velocity, and are subject to redundancy in measurements and observations in the airspace traversed.

In a second aspect, a plurality of aircraft navigating as a group within a distance r/2, where r is ADS-B data link range, are geographically proximate such that each group member can receive the ADS-B signal broadcast by every other group member, thus ensuring that a fully connected one communication hop network graph exists within the group. A group of geographically proximate aircraft can consecutively receive an ADS-B beacon from a prover, i.e., an aircraft claiming to be at a position. A group of aircraft can then use IP network air-to-air links to communicate the times of arrival of the ADS-B signal and verify the ADS-B position.

In another aspect, the group travel concept and communications between the aircraft in group, can be combined for verifying and validating ADS-B data on aircraft. Data communication between all aircraft in a navigating group of aircraft allows all the group members to, as and when needed, communicate their spatial and temporal measurements and collaborate in group protocols, e.g., majority voting protocol, which can determine if a received ADS-B message is corrupted or from a false target aircraft. Distributed protocols based on group communications and majority voting are known for detecting compromised members, i.e., false target aircraft, and for verifying message integrity, i.e., ADS-B data, given a minority fraction of members are compromised or colluding. Such protocols can be based on IP multicast communications over IP networking data links that are available on the aircraft.

The outcome of the verification will be trustworthy provided that a majority of the group members are not false aircraft or compromised aircraft. The level of confidence in the outcome can be enhanced by including inputs from neighbors, multiple communication hops away, in the group protocol.

The disclosed method for verifying and validating ADS-B data offers several capabilities as follows: (1) a mapping between group communications and ADS-B enabled airborne surveillance to enable the applicability of position estimation methods based on three or more receivers, e.g., time-of-arrival based multilateration, and collaborative protocols, e.g., majority voting; (2) a solution approach for enabling ADS-B IN mode on aircraft, since aircraft are capable of verifying and validating received ADS-B data with high confidence; and (3) use of IP-based Aeronautical Telecommunications Network (IP ATN).

Figure 3:
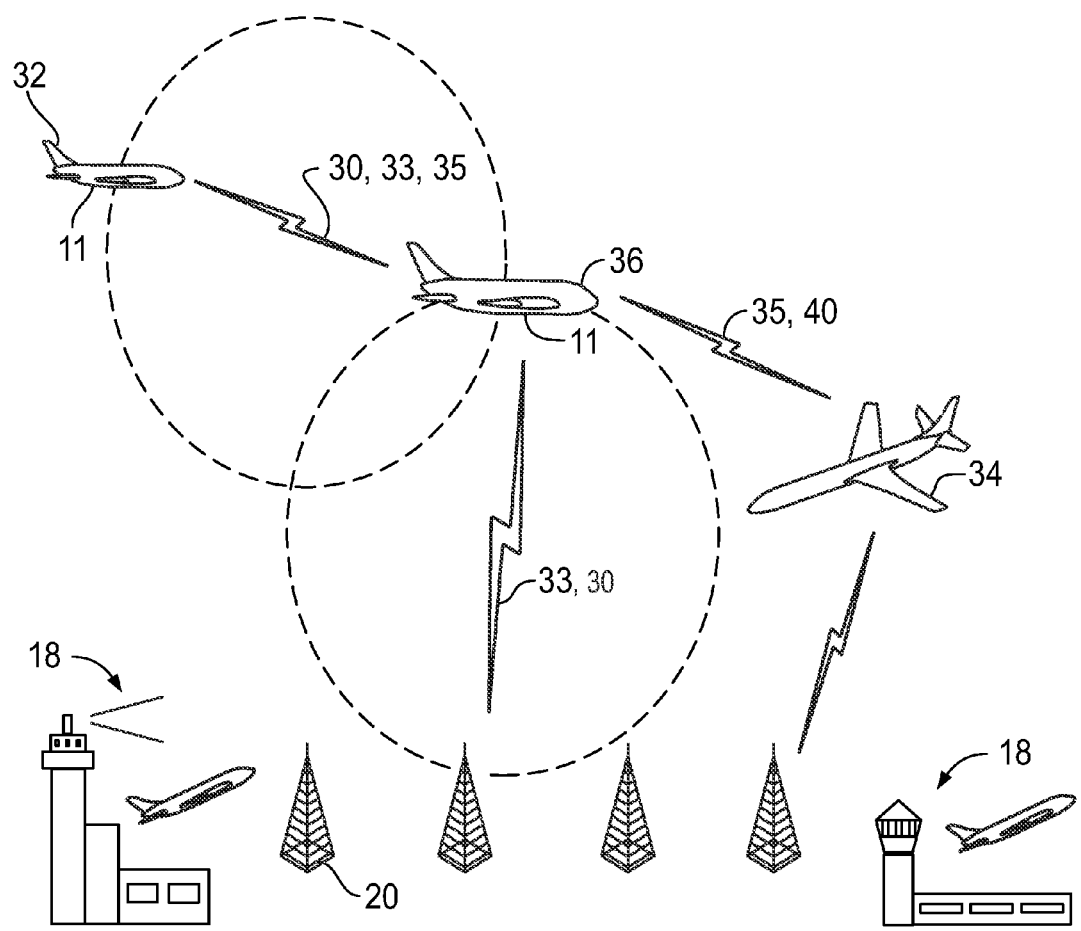
FIG. 3 is an illustration of an Aircraft Ad hoc Network (AANET) scenario showing e-enabled airplane communications, and an overview of AANET architecture.

During a flight, an airplane may traverse multiple airports with possible lack of network connectivity at one or more of the traversed airports. Additionally, the airplane may find varying network environment such as protocol standards, security technologies, and export restrictions. The airplane may also interact with multiple off-board systems, e.g., airport wireless access points and airline systems. Solutions for the Aircraft Ad hoc Network (AANET) therefore must be adaptable and scalable to ensure seamless air travel for the airplane. FIG. 3 illustrates an AANET scenario showing e-enabled airplane communications, and an overview of AANET architecture, as discussed in greater detail below. Furthermore, airplanes generally follow predictable routes, except in free flight zone 16, and travel from airport 18 to airport 18 in an estimated trip time. Therefore; airplanes that are within communication range of one another and moving in a similar direction can be expected to navigate as a group defined of nodes forming a fully connected network graph within the group. For example, ADS-B based on 1090-ES can provide a communication range between 40 to 90 nautical miles.

Airborne surveillance, however, is currently impeded by the dearth of feasible solutions for verification of positions and integrity protection of information received by aircraft via aircraft to aircraft or via aircraft to infrastructure broadcasts. The problem is challenging because of the infeasibility of performing time-of-arrival based multilateration in a single mobile aircraft as well as potential for easy spoofing over the aircraft to infrastructure as well as aircraft to aircraft link. The disclosed network-based method enables aircraft to verify their respective positions, by ensuring more information, such as spatial and temporal observations, on the claimer, or transmitting aircraft is available to the verifier from available surveillance data sources, such as from one or more of the one-hop neighbors in the group.

Referring to FIG. 1, an exemplary air traffic control system 10 is shown. Aircraft 12 may be operating in a free-flight zone 16, generally described as an area remote from a restricted flight terminal area 14. Aircraft 12 may include commercial aircraft 12a, military aircraft 12b, general aircraft 12c, and/or unmanned aerial systems (UAS) 12d. Terminal areas 14 or surveillance radar stations 18 generally are positioned in restricted flight areas. In free flight area 16, cooperative navigation between a group 12 of aircraft 12a, 12b, 12c and 12d, or air-to-air communications, is employed for positional navigation when the aircraft are traversing the shared free flight airspace 16. The e-enabled aircraft 12a, 12b, 12c and 12d, may exchange onboard equipment software updates and data with entities that are outside the range of air traffic management. Each of the e-enabled aircraft 12a-d is equipped with onboard systems to compute and update highly accurate actual position information for navigation and surveillance. ADS-B data links 30 (FIG. 3) and IP ATN links 33 (FIG. 3) provide data links between aircraft and air traffic control centers, which are referred to as aircraft-to-infrastructure communications. Further, ADS-B data links 30 (FIG. 3) and IP ATN data links 33 (FIG. 3) provide data links for surveillance between aircraft 12a, 12b, 12c and 12d, which are referred to as aircraft-to-aircraft communications. In one embodiment, the aircraft-to-aircraft communication may have a per-hop communication range of 40 to 90 nautical miles for ADS-B, e.g., 1090 MHz Extended Squitter data link, or over 117 miles for IP ATN links 33, e.g., L-band Digital Aeronautical Communication System data link. Apart from aircraft periodic traffic beacons, the ADS-B data links 30 are used to communicate traffic information broadcasts from ground controllers such as real-time weather and locations of aircraft with no ADS-B communication units. The accessibility of such traffic information can be extended via multi-hop communications between aircraft. IP ATN links 33 (FIG. 3) are used to transfer data for air traffic services and airline operational control well known to those having skill in the art.

Figure 2:
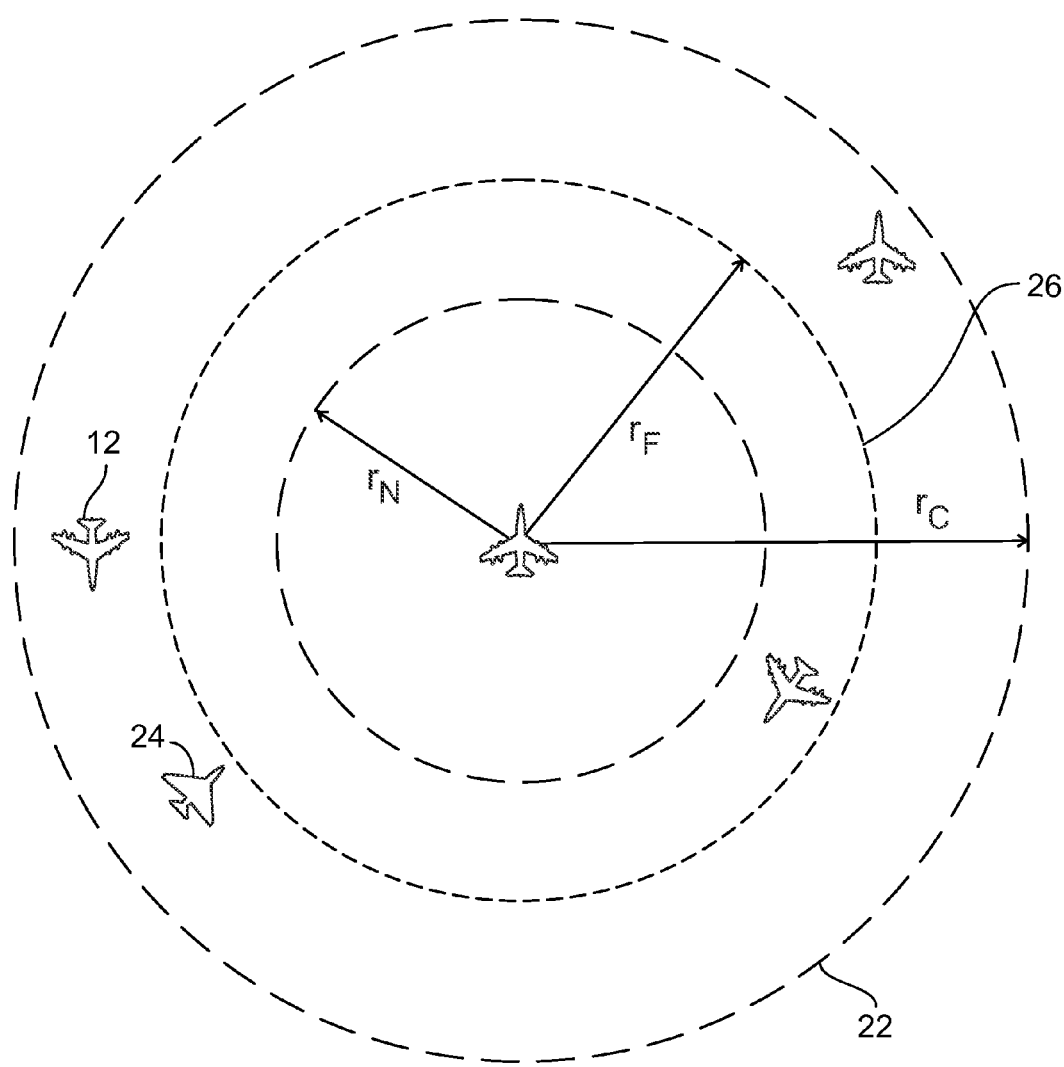
FIG. 2 illustrates an exemplary communication range circle.

A communication range circle 22 is defined in FIG. 2. Upon detection of a malicious attack, e.g., a spoofed air traffic control message, a safe solution is a combination of technology and processes to (i) increase the radius of the circle of avoidance for aircraft 12 over a short period of time, i.e., the radius of the circle of avoidance 26 under nominal surveillance increases from $r_N$ to $r_F$, with $r_F$, the circle of avoidance under failing surveillance, being greater than $r_N$, and (ii) ensure that the transition is safe even in the presence of a malicious node or attacker 24 in the system 10. The choice of $r_F$ determines a level of efficiency in operation and a required transition time. For instance, the circle of avoidance $r_C$ of secondary surveillance radar is highly conservative and may not provide the best result in all situations. The use of a pessimistic radius enables an attacker 24 to enlarge the impact of an exploit from a terminal area 14 to an entire traffic center. The enabled applications in this air traffic control system model 10 can be generally classified to be aircraft to infrastructure-Out if aircraft is only broadcasting data, or aircraft to aircraft and aircraft to infrastructure-In if aircraft is broadcasting data as well as utilizing and forwarding data in received broadcasts. A ground surveillance station 20 using ADS-B is an aircraft to infrastructure-Out application. Airborne surveillance and traffic information service using ADS-B are aircraft to aircraft/aircraft to infrastructure-In applications.

Aircraft 12a, 12b, 12c and 12d are subject to mobility constraints which require that the aircraft 12a, 12b, 12c and 12d mostly follow predictable routes. Aircraft 12a, 12b, 12c and 12d also travel in a pre-determined time for a flight. Therefore, aircraft 12a, 12b, 12c and 12d traversing in a similar direction and within one-hop communication range can form a navigating group 12 of nodes 11 forming a fully connected network within group 12 for relatively long time periods.

Figure 6:
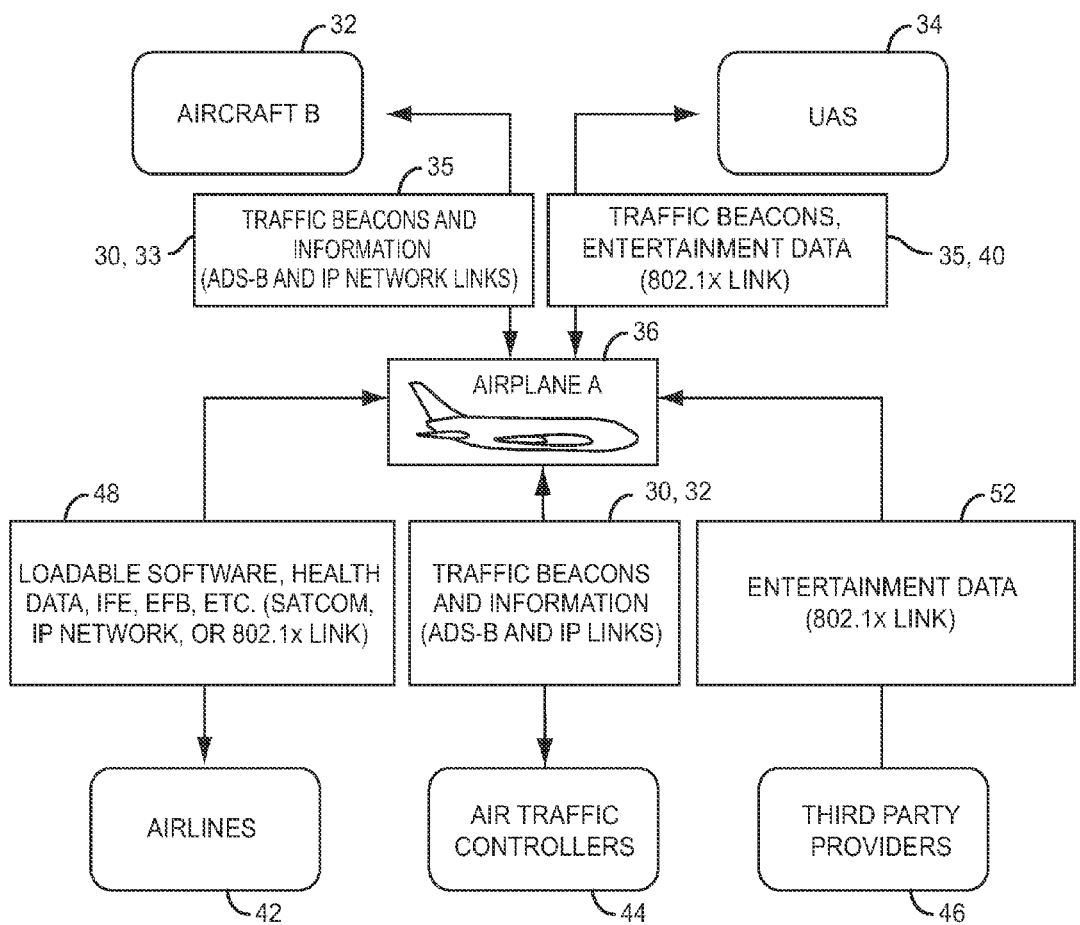
FIG. 6 illustrates an AANET system model with different types of communications received by commercial aircraft.

Referring to FIGS. 3 and 6 an exemplary embodiment of an AANET scenario 40 showing e-enabled airplane communications with aircraft to aircraft communication and aircraft to ground communications. An overview of the AANET architecture 50 (See, e.g., FIG. 6) includes Airplane B 32 and UAS 34 in communication with Airplane A 36. Traffic beacons 35 are exchanged between airplane B 32, airplane A 36 and UAS 34. Airplanes 32, 36 are configured to communicate via ADS-B link 38, and UAS 34 and airplane A 36 are configured to communicate traffic beacons 35 as well as entertainment data via IEEE 802.1x link 40. Similarly, airlines 42, air traffic controllers 44 and third party providers 46 are configured to communicate with airplane A 36 via SATCOM 802.1x links, or ADS-B link. Airlines 42, for example, may provide loadable software, health data, In-Flight Entertainment (IFE), Electronic Flight Bag (EFB), etc. over SATCOM or 802.1x link 48. Air traffic control 44 may communicate traffic beacons and information over ADS-B link 30. Third party providers 46 may communicate, for example, entertainment data via link 52.

Figure 4:
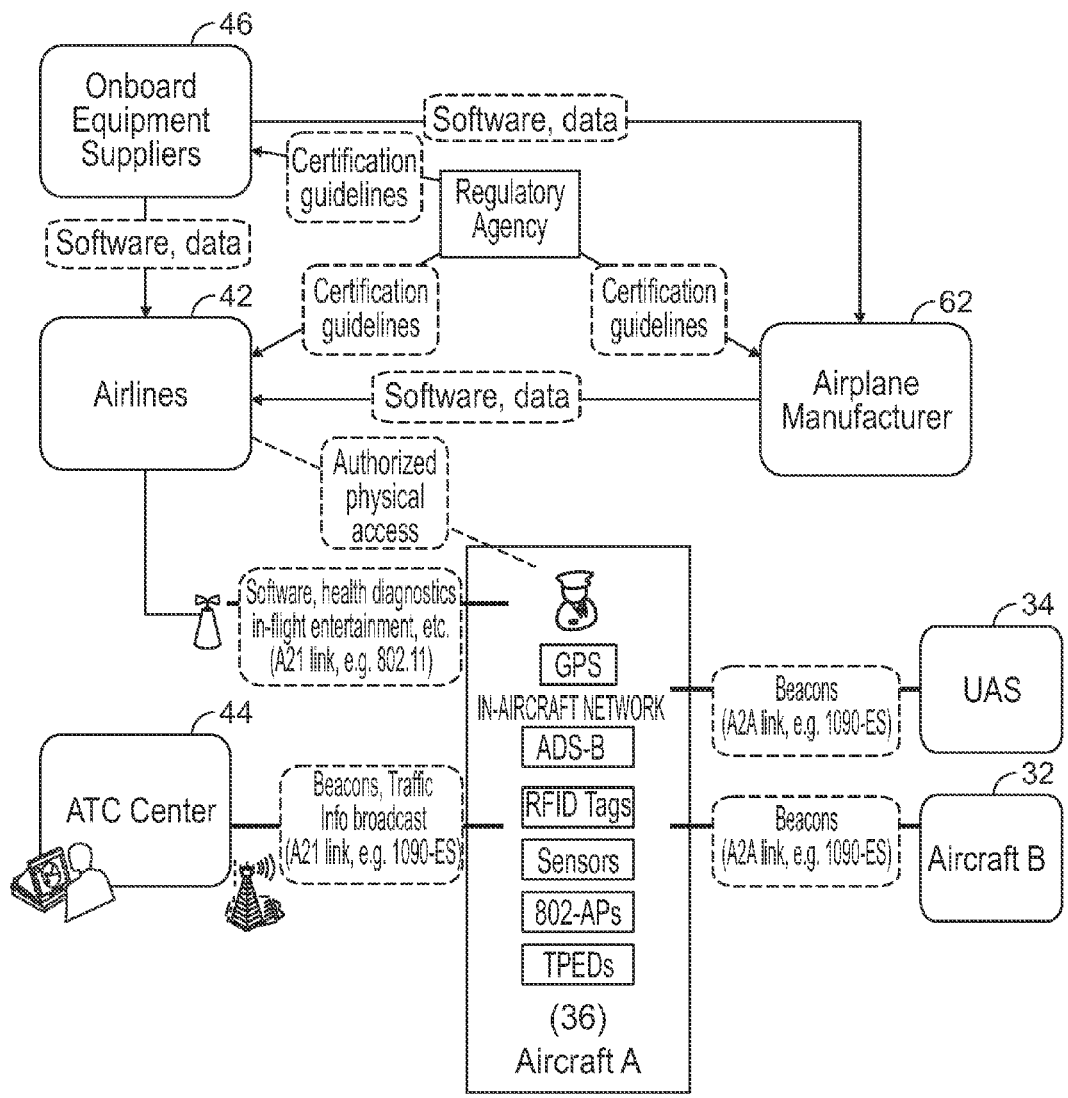
FIG. 4 illustrates an abstraction of a future air traffic control system model.

Referring next, to FIG. 4, there is illustrated another exemplary embodiment of an air traffic control system model 60. The air traffic control system model 60 includes onboard equipment third party suppliers 46, airlines 42, ATC center 44, and airplane manufacturer 62. Aircraft 36 includes an in-aircraft control network 64, including the Global Positioning System (GPS), ADS-B, Radio Frequency Identification (RFID) tags, sensors, and IEEE 802.1x compatible applications. GPS is a space-based global navigation satellite system which provides continuous positioning, navigation, and timing services to users.

Figure 5:
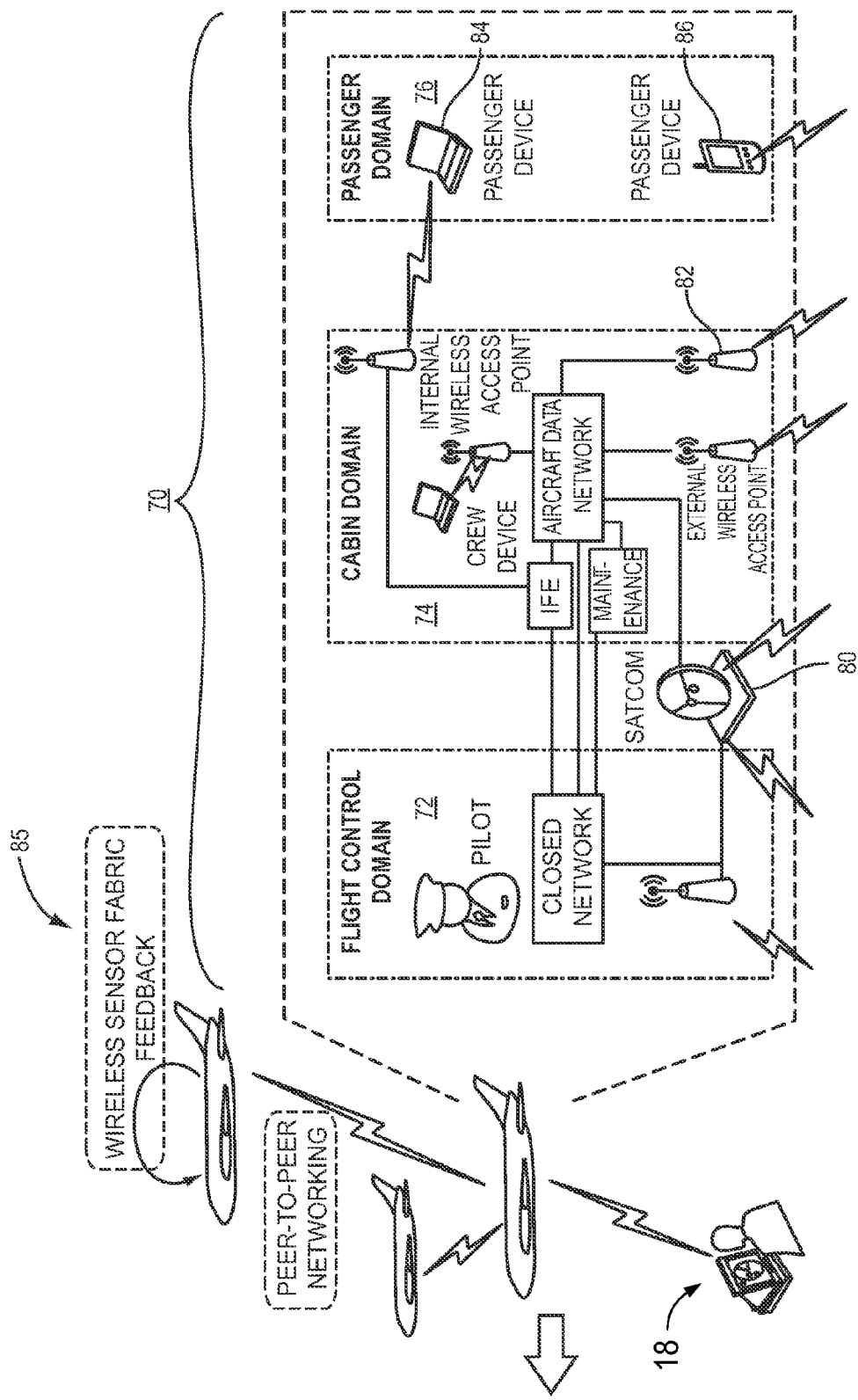
FIG. 5 illustrates logical domains of commercial aircraft systems.

Referring next to FIG. 5, there are logical domains 70 of commercial aircraft systems including flight control domain 72, cabin domain 74 and passenger domain 76. Flight control domain 72 is used by flight officers or pilots in a closed network in communication via terrestrial and 1090-Extended Squitter links or SATCOM. Cabin domain 74 includes IFE, aircraft data network and maintenance connected through SATCOM 80, internal and/or external wireless access points 82. Passenger domain 76 includes passenger devices such as portable PC 84 or notebook computers or cellular telephones 86. The communications network 85 may be, e.g., a wireless sensor fabric feedback that uses wireless communications, for example, for fuel economy and to reduce aircraft weight, wireless sensors for accurately quantifying individual aircraft emissions and pollution impacts, and peer-to-peer networking for reducing air traffic delays.

FIG. 5 illustrates an aircraft that includes several control and data networks over the flight control, cabin and passenger domains 74, 76. Currently, the benefits of wireless network is limited only to the cabin and passenger domains for performing non-critical cabin functions (e.g., emergency lighting), aircraft maintenance (e.g., LRU part marking and crew information access), and in-flight entertainment (e.g., Internet access). For networks in the other domains which perform critical or regulated functions, the use of wireless communication may raise safety, reliability and availability concerns for the connected systems.

When an ADS-B signal from an aircraft P is received by four or more verifier aircraft, $\{V\}=\{V_1, V_2, V_3, V_4\}$, then $\{V\}$ can use time-difference-of arrival technique to estimate the 3-D position of P. In this technique, verifier aircraft share the times they received the signal from P, compute the differences between times, and then perform multilateration computations to estimate an actual position of P. An exemplary method of estimating an actual position is described by Capkun and Hubaux, "Securing Position and Distance verification in Wireless Networks", Technical Report EPFL/IC/200443, May 2004, incorporated herein by reference. RF signals cannot propagate faster than the speed of light. Therefore, if four or more verifiers can communicate the time instances at which they received ADS-B signal of P, they can independently estimate P's actual position and verify claimed position in ADS-B message of P. It should be noted here that instead of time of arrival, each verifier aircraft in $\{V\}$ may independently estimate the relative distance to aircraft P based on the received signal strength. However, since an adversary may be able to vary its transmission power, the verifier does not know the transmitted signal strength. Hence the verifier aircraft are not able to reliably estimate the relative distance based on the received signal strength. Moreover, distance measurements are susceptible to distance enlargement or reduction and must be accounted for in an error margin.

The group concept and time-difference-of-arrival based multilateration together may enable a group of aircraft to securely communicate time measurements of a received ADS-B signal, use the communicated measurements to self estimate the actual position of the source of the ADS-B signal, and if needed perform secure voting to invalidate any potentially corrupt or spoofed ADS-B message.

An exemplary position verification protocol is initiated when one or more members of group G receive an ADS-B message from P, where P can be (i) an aircraft not in G, or (ii) an aircraft in G which is observed by the members to be behaving erroneously for a certain time period.

Figure 7:
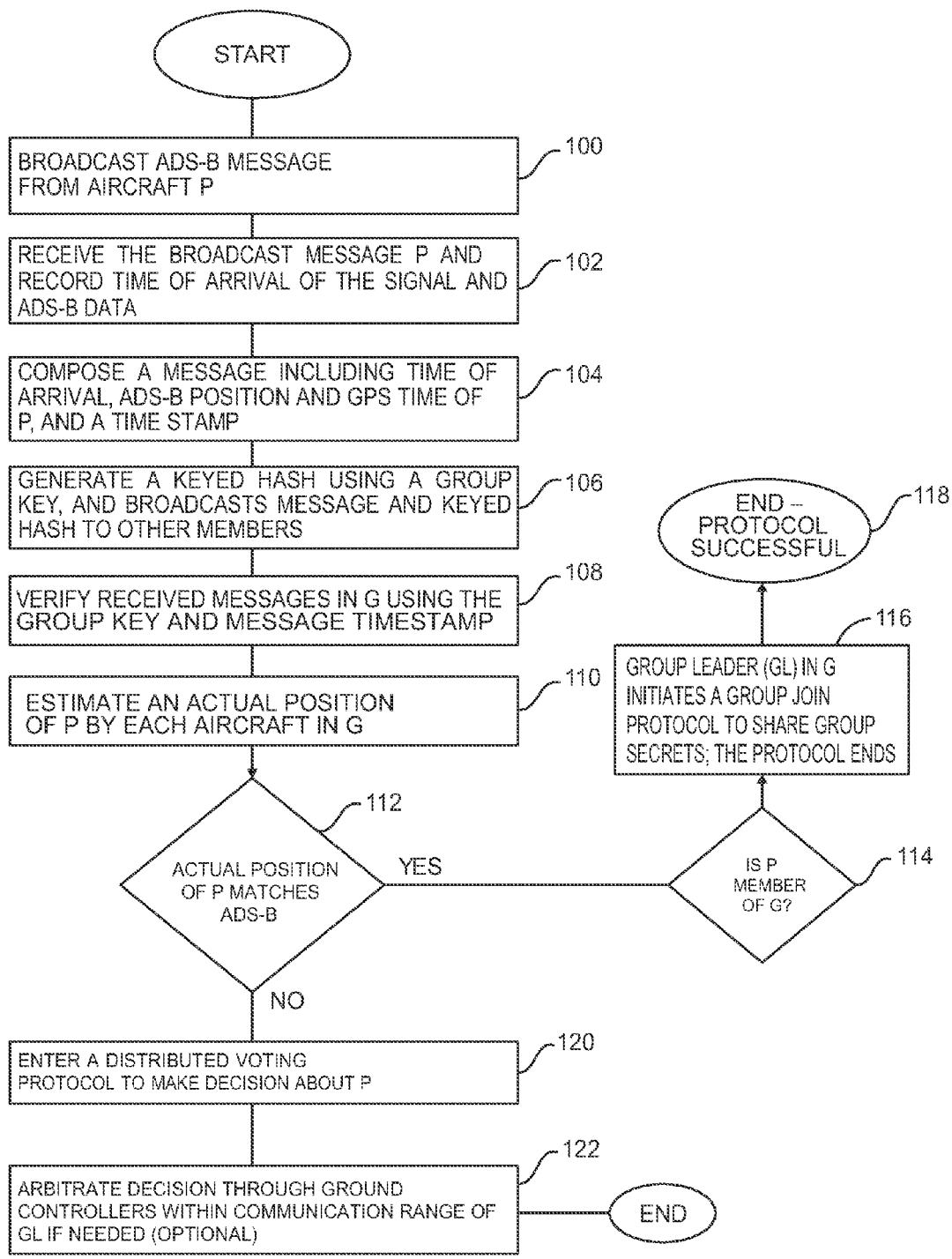
FIG. 7 includes a flow chart description of an exemplary method for position indication message verification protocol.

FIG. 7 shows an exemplary method for the position verification protocol. For simplicity in this example, it is assumed that all members of group G form the set of verifiers and that P is not a member of the group G, although in alternate embodiments, P may be included within group G. As shown in step 100, P broadcasts an ADS-B message, including the position coordinates and time. In step 102, the members of a group G receive the broadcast message sent by P, and upon receiving the ADS-B signal members of group G record the time of arrival of the signal as well as the data in the ADS-B message. Next, in Step 104, each member of the group G composes a message that contains the recorded time of arrival, ADS-B position and GPS time of P, and a time stamp. At step 106, each member of group G generates a keyed hash using a group key, and broadcasts the message and keyed hash combined to the other members of group G over IP network link. At step 108, each member of group G verifies received messages from members and, at step 110, each member of group G performs time-difference-of-arrival multilateration to estimate the actual position of P (Step(4)). An exemplary pseudo code for the method is set forth below:

G={V}; $V_i$ is in {V}; P is not in G
(1) P →: $ADSB_P$
(2) $V_i$: $T_i$ = time of arrival of ADS-B signal from P at $V_i$
(3) $V_i$ → G: $(I_p, t_p)$, $T_i$, timestamp, $MAC_k\{(I_p, t_p), T_i,$ timestamp$\}$
(4) $V_i$ : perform multilateration computation on $\{T_1, T_2, T_3..., T_{|G|}\}$
  : $I'_p$ = computed estimate of P's actual position
  if $I'_p$ not same as $I_p$
      $V_i$ →GL: initiate voting protocol for message invalidation
      G: execute voting protocol
      else if P is new to G
          GL: initiate Group Join protocol for P
      endif Next, at step 112, the members of group G determine whether there is a match between the actual position and the claimed position of P. If there is a match between actual position and claimed position of P, the members of group G proceed at step 114 to determine whether P is a member of the group. If P is not a member of the group then the method proceeds to step 116, and GL initiates a Group Join protocol to share group secrets; the protocol ends with a success at step 118. If P is a member of the group then the protocol ends with a success at step 118.

If at step 112 the members of group G determine that there is not a match between the actual position and the claimed position of P, then group G proceeds to step 120 and enters into a distributed voting protocol to decide if P is a compromised aircraft or not. At step 122, group G may optionally invoke one or more ground controllers within communication range of the GL to act as an arbiter to resolve the situation where the group cannot internally resolve the question of whether P may be a compromised aircraft to a satisfactory level of confidence. Next, at step 124, the message authentication code (MAC) using the group key k is used to protect the integrity and source authenticity of group communications, and the limestamp is used to mitigate any replay of the message.

Alternate embodiments may include various other protocols employed in the group, for example, a group formation protocol in which an aircraft initiates a group, a group join protocol in which an aircraft joins an existing group, a group leave protocol in which an aircraft exits a group, and a group leader (GL) election protocol for periodic randomized election of a leader, as well as for establishment of the group key or other group secrets, are described by Sampigethaya, Li, Huang, Poovendram, "AMOEBA: Robust Location Privacy Scheme for VANET", IEEE Journal on Selected Areas in Communications, 25:8, pp. 1569-1589, which is incorporated herein by reference.

Assuming that aircraft are uniformly distributed in an exemplary two dimensional airspace with a density ρ, number of aircraft in area A, denoted N(A), distributes as a spatial Poisson process in Equation 1 below:

$$Pr\{N(A) = i\} = \frac{(\rho A)^i}{i!} e^{-\rho A}, \qquad \text{Equation 1}$$

For a group of aircraft $G_i$, the average group size expected value may be calculated by Equation 2:

$$E\{|G_i|\} = E\{N(A) \mid N(A) \geq 1\} \quad \text{Equation 2}$$
$$= \frac{E\{N(A)\}}{1 - Pr\{N(A) = 0\}}$$
$$= \frac{\rho A}{1 - e^{-\rho A}}$$

In the exemplary 2-D airspace, group $G_i$ preferably may include at least one aircraft designated as the group leader. In an alternate embodiment, group $G_i$ may potentially include all aircraft within the circular region, as indicated by Equation 3:

$$A \leq \pi r_{G_i}^2, \quad \text{Equation 3}$$

where $r_{G_i} = r_0/2$, and $r_0$=aircraft transmission range.

Therefore, bounds for the average group size is indicated in Equation 4:

$$1 \leq E\{|G_i|\} \leq \frac{\rho \pi r_{G_i}^2}{1 - e^{-\rho \pi r_{G_i}^2}}, \quad \text{Equation 4}$$

Using the derived upper bound in Equation 4, the theoretical maximum group size achievable for a given airspace density may be determined. As the aircraft transmission range increases from 40 nautical miles (nm) to 100 nm, the group size for a given density increases significantly. This type of evaluation can provide valuable inputs to the study of tradeoffs between using a large aircraft transmission range versus lowering interference of ADS-B and IP network communications. The evaluation also informs the choice of $r_0$ needed to enhance separation assurance using airborne surveillance. In one embodiment, a group leader rotation mechanism may be employed to ensure that a compromised aircraft cannot manipulate ATC communications of a group. The election of the leader may preferably be randomized among the group members. An exemplary leader election method is described by Russell and Zuckerman, "Perfect Information leader election in log*n+O(1) Rounds", $39^{th}$ Annual Symposium on Foundations of Computer Science (FOCS) Proceedings, ppp. 576-583, November 1998, incorporated herein by reference. Furthermore, because the group leader incurs overhead, e.g., computations and communications needed for group join, a periodic leader rotation maintains equality of resources expended by group members in the ATC system.

In another embodiment, to avoid a compromised group member, aircraft may initiate and form a secure group when they begin their flight and leave a terminal area, since ground controllers may detect any compromised aircraft that is manipulating ADS-B data within the newly formed group. Once this group of aircraft is in free flight or in a region with sparse ground controller coverage, each aircraft in the group may perform its airborne surveillance independently. During this period, provided a majority of the group members are not compromised, an adversary or compromised aircraft cannot spoof or corrupt ADS-B data without detection in the group. Furthermore, since ground controllers are not considered part of the newly formed group, compromising a ground controller will not adversely influence the group.

It is important to note that the construction and arrangement of the method for validating aircraft traffic control data, as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

What is claimed is:

1. An aircraft of a plurality of aircraft navigable as a group of aircraft, the aircraft comprising:
   a receiver configured to receive a position indication message broadcast by a source aircraft to the aircraft and other aircraft of the group of aircraft, the position indication message including a claimed position of the source aircraft; and
   an in-aircraft control network configured to:
      record a first time of arrival of the position indication message at the aircraft;
      receive messages broadcast by the other aircraft and containing second times of arrival of the position indication message at the other aircraft;
      perform a position estimation based on the first time of arrival and second times of arrival to produce an estimated actual position of the source aircraft; and
      verify the claimed position of the source aircraft based on the estimated actual position of the source aircraft, and
   wherein the in-aircraft control network is further configured to:
      compose a message including the first time of arrival of the position indication message at the aircraft; and
      cause broadcast of the message to at least some of the other aircraft to enable the at least some of the other aircraft to independently perform the position estimation and verify the claimed position of the source aircraft based thereon.

2. The aircraft of claim 1, wherein the position indication message received by the receiver is an automatic dependent surveillance broadcast message, and wherein the position estimation performed by the in-aircraft control network includes time-difference-of-arrival multilateration.

3. The aircraft of claim 1, wherein the messages broadcast by the other aircraft further contain a keyed hash generated using a group key, and
wherein the in-aircraft control network is further configured to verify the messages based on the keyed hash.

4. The aircraft of claim 3, wherein the in-aircraft control network is further configured to initiate a group join protocol in at least one instance in which the claimed position is verified and the source aircraft is not within the group of aircraft, the group join protocol being initiated to join the source aircraft to the group of aircraft and share group secrets with the source aircraft, the group secrets including the group key.

5. The aircraft of claim 1, wherein the in-aircraft control network being configured to compose the message includes being configured to compose the message further containing a keyed hash generated using a group key.

6. The aircraft of claim 1, wherein the in-aircraft control network being configured to verify the claimed position includes being configured to determine whether the claimed position and the estimated actual position are approximately equivalent.

7. The aircraft of claim 1, wherein the in-aircraft control network is further configured to initiate a group join protocol in at least one instance in which the claimed position is verified and the source aircraft is not within the group of aircraft, the group join protocol being initiated to join the source aircraft to the group of aircraft.

8. The aircraft of claim 7, wherein the group join protocol is initiated to further share group secrets with the source aircraft, the group secrets including a group key.

9. The aircraft of claim 1, wherein the in-aircraft control network is further configured to enter into a distributed voting protocol with the other aircraft of the group of aircraft in at least one instance in which the claimed position is not verified, the distributed voting protocol being entered into to decide whether or not the source aircraft is compromised.

10. A method for verification a claimed position of a source aircraft by an aircraft of a plurality of aircraft navigable as a group of aircraft, the method comprising:
receiving a position indication message broadcast by the source aircraft to the aircraft and other aircraft of the group of aircraft, the position indication message including the claimed position of the source aircraft;
recording a first time of arrival of the position indication message at the aircraft;
receiving messages broadcast by the other aircraft and containing second times of arrival of the position indication message at the other aircraft;
performing a position estimation based on the first time of arrival and second times of arrival to produce an estimated actual position of the source aircraft; and
verifying the claimed position of the source aircraft based on the estimated actual position of the source aircraft,
and
wherein the method further comprises:
composing a message including the first time of arrival of the position indication message at the aircraft; and
causing broadcast of the message to at least some of the other aircraft to enable the at least some of the other aircraft to independently perform the position estimation and verify the claimed position of the source aircraft based thereon.

11. The method of claim 10, wherein the position indication message is an automatic dependent surveillance broadcast message, and
wherein the position estimation includes time-difference-of-arrival multilateration.

12. The method of claim 10, wherein the messages broadcast by the other aircraft further contain a keyed hash generated using a group key, and
wherein the method further comprises verifying the messages based on the keyed hash.

13. The method of claim 12 further comprising:
initiating a group join protocol in at least one instance in which the claimed position is verified and the source aircraft is not within the group of aircraft, the group join protocol being initiated to join the source aircraft to the group of aircraft and share group secrets with the source aircraft, the group secrets including the group key.

14. The method of claim 10, wherein composing the message includes composing the message further containing a keyed hash generated using a group key.

15. The method of claim 10, wherein verifying the claimed position includes determining whether the claimed position and the estimated actual position are approximately equivalent.

16. The method of claim 10 further comprising:
initiating a group join protocol in at least one instance in which the claimed position is verified and the source aircraft is not within the group of aircraft, the group join protocol being initiated to join the source aircraft to the group of aircraft.

17. The method of claim 16, wherein the group join protocol is initiated to further share group secrets with the source aircraft, the group secrets including a group key.

18. The method of claim 10 further comprising:
entering into a distributed voting protocol with the other aircraft of the group of aircraft in at least one instance in which the claimed position is not verified, the distributed voting protocol being entered into to decide whether or not the source aircraft is compromised.

* * * * *